Figure 1:
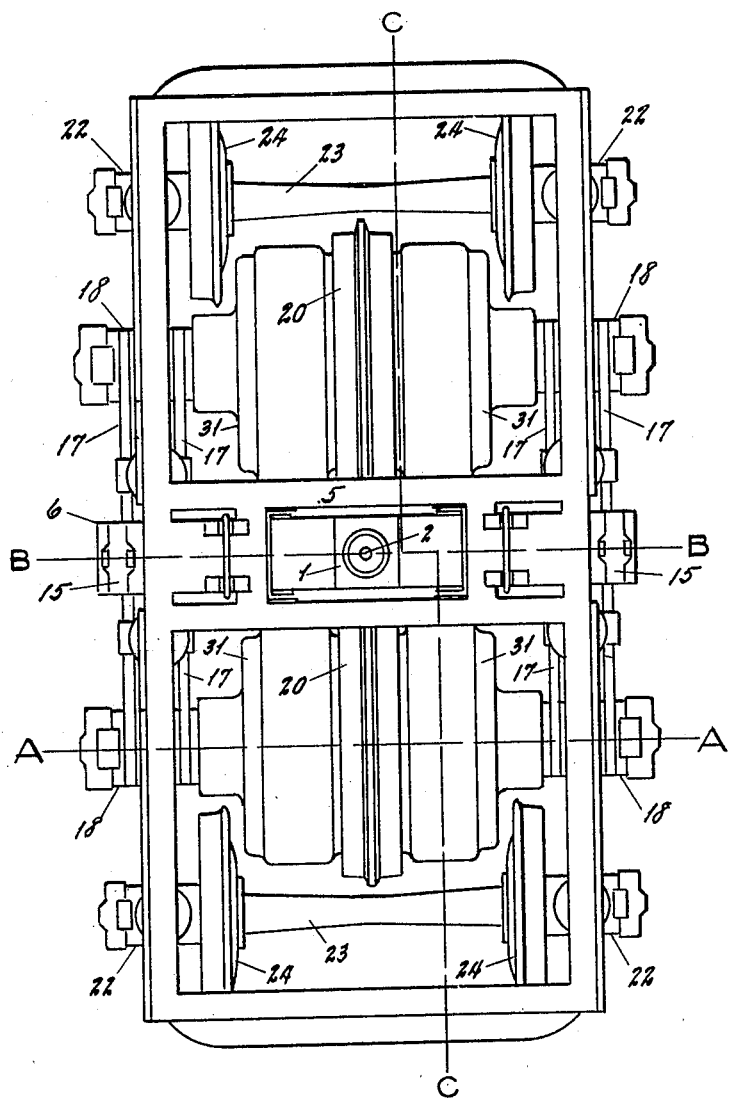

S. E. HITT.
RAILWAY TRUCK.
APPLICATION FILED DEC. 19, 1907.

913,136.

Patented Feb. 23, 1909.
4 SHEETS—SHEET 1.

WITNESSES:

INVENTOR.

S. E. HITT.
RAILWAY TRUCK.
APPLICATION FILED DEC. 19, 1907.

913,136.

Patented Feb. 23, 1909.
4 SHEETS—SHEET 2.

WITNESSES:
Francis Davis,
Edward A. Wilhelm

INVENTOR:
Samuel E. Hitt

THE NORRIS PETERS CO., WASHINGTON, D. C.

S. E. HITT.
RAILWAY TRUCK.
APPLICATION FILED DEC. 19, 1907.

913,136.

Patented Feb. 23, 1909.
4 SHEETS—SHEET 3.

WITNESSES:

INVENTOR.
Samuel E. Hitt.

S. E. HITT.
RAILWAY TRUCK.
APPLICATION FILED DEC. 19, 1907.

913,136.

Patented Feb. 23, 1909.
4 SHEETS—SHEET 4.

WITNESSES:

INVENTOR.

UNITED STATES PATENT OFFICE.

SAMUEL E. HITT, OF PITTSBURG, PENNSYLVANIA.

RAILWAY-TRUCK.

No. 913,136.  Specification of Letters Patent.  Patented Feb. 23, 1909.

Application filed December 19, 1907. Serial No. 407,247.

*To all whom it may concern:*

Be it known that I, SAMUEL E. HITT, a citizen of the United States, residing at Pittsburg, in the county of Allegheny and State of Pennsylvania, have invented certain Improvements in Railway-Trucks, of which the following is a specification.

My invention consists in a novel form of truck for passenger, freight or motor cars for high speed service on my improved railway, described and claimed in the accompanying application.

The general object of my invention is to provide a truck that runs smooth and true, thus lessening the jolt and jar transmitted to the car and the amount of power required to maintain the high speeds, thereby insuring safe, fast and comfortable passenger service and fast freight service at a minimum expense of equipment, operation and maintenance. The general principle of pivoting a car upon a truck having two or more wheels in line upon the same rail is retained, the novel feature consisting in the use of central load carrier wheels and the distribution of the load between the load carrier wheels and the outer wheels.

The objects of my invention are then to provide a spring truck which carries the main load direct to the central wheels and which throws any tilting load on the outer wheels and also to provide means for driving same or all of the load carrier wheels.

A further object of my invention is to lessen the so called external friction, or reaction of the track and wheels.

A further object of my invention is to lessen the so called internal friction of the truck and the rolling friction of the wheels on the track.

A further object of my invention is to provide a truck adapted for the use of electric power, and in which the motors are directly connected to the driving axles.

A still further object of my invention is to provide a truck adapted for the use of my wheel with double tread to run on companion rails, as set forth in my application filed July 30th, 1907, Serial Number 386,285.

In trucks as heretofore built for the two rail track, considerable side motion is caused by irregularities in the track and from imperfect rail joints and it is a further object of my invention to so adjust the flange clearance of the load carrier wheels as to reduce this shifting of the load sidewise to a more gradual movement.

Figure 2:
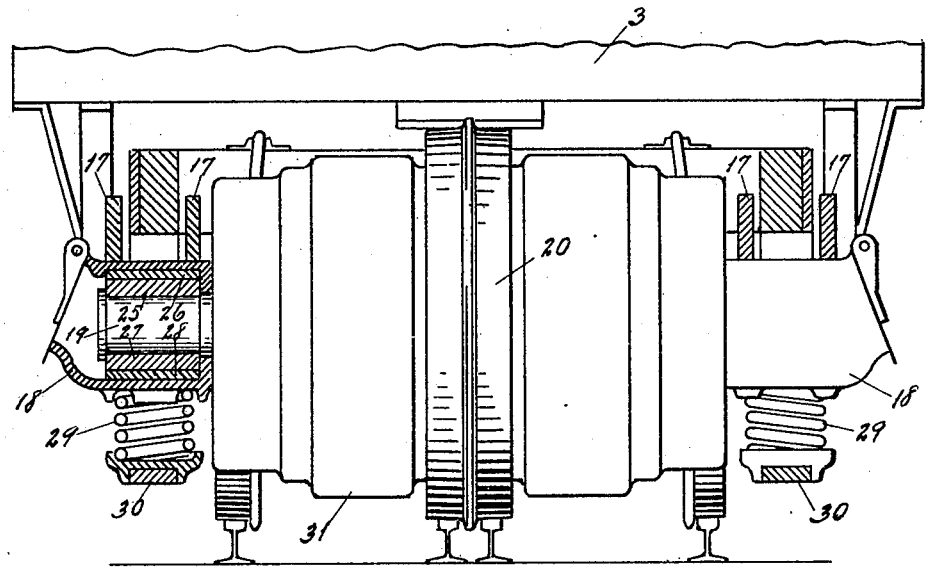
Figure 3:
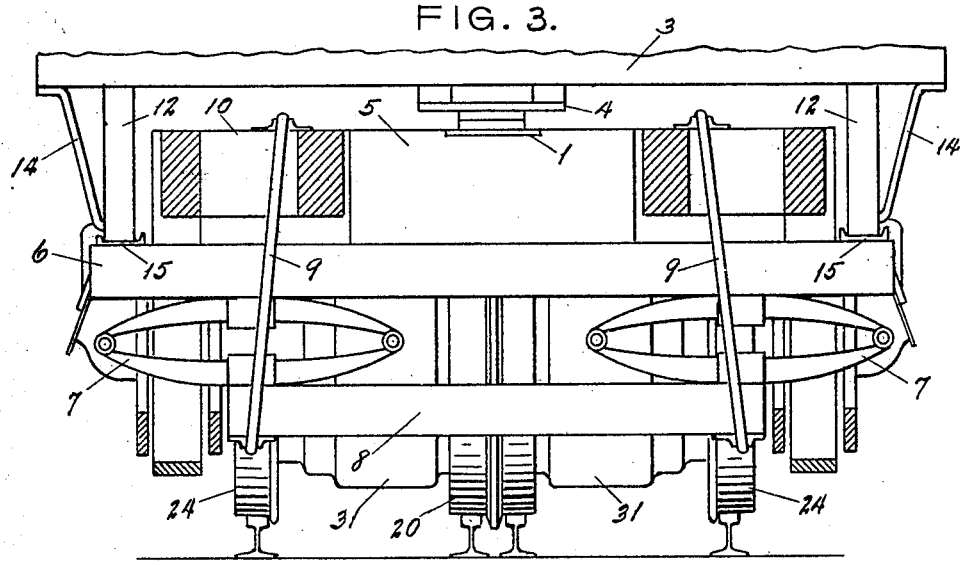
Figure 4:
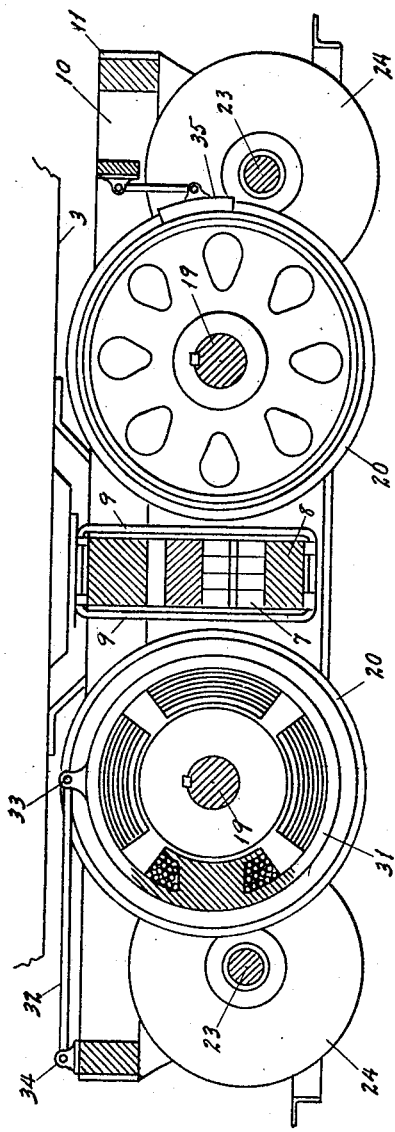
Figure 5:
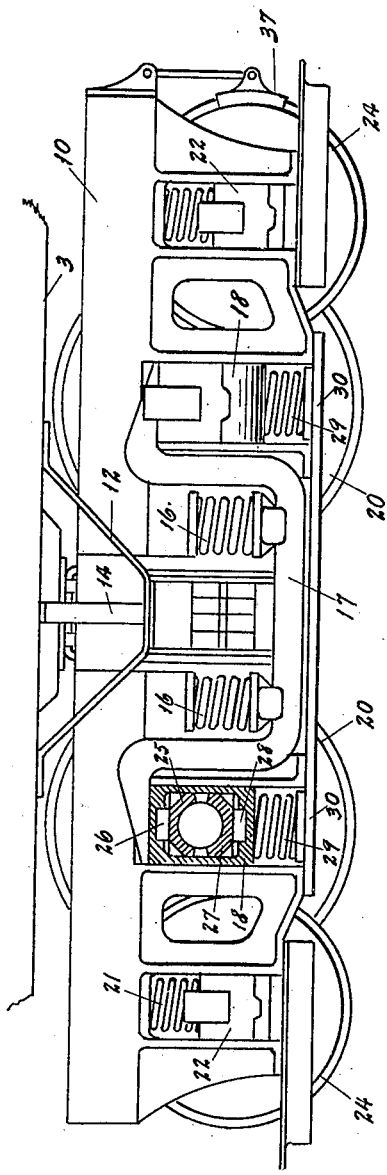
Figure 6:
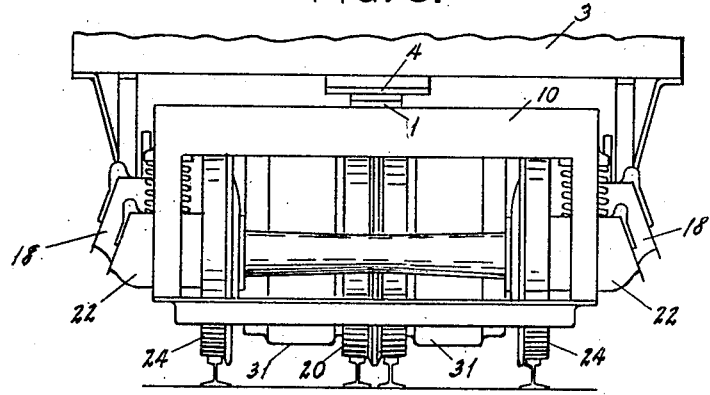
Figure 7:
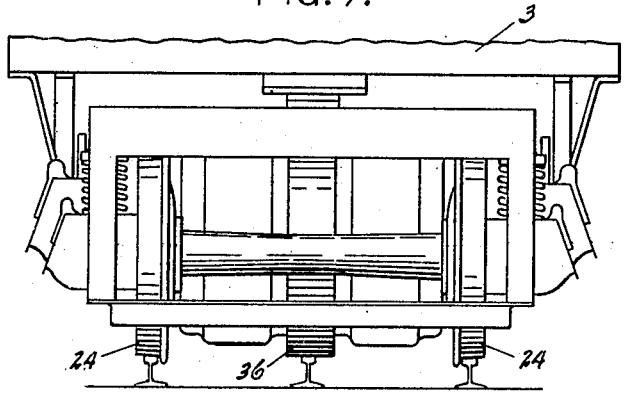

In the drawings: Figure 1— is a plan of the truck. Fig. 2— is a section on the line A—A of Fig. 1. Fig. 3— is a section on the line B—B of Fig. 1. Fig. 4— is a section on the line C—C of Fig. 1. Fig. 5— is a side view of the truck. Fig. 6— is an end view of the truck. Fig. 7— is an end view of the truck with flangeless load carrier wheels.

In Fig. 1— the bolster 1 has a hole 2 for center pin connection to a car body 3. In Fig. 3— the car body 3 is supported by the bolster 4, 1, the load transmitted through the truck bolster 5, the transom 6, the elliptical springs 7, the spring plank 8 and the links 9 to the truck frame 10.

Although I have shown a truck with wooden frame and flitch plates, the truck can be of metal throughout without departing from the intent and purpose of the invention.

The tilting load is transmitted from the car 3 by side bearing brackets 12, fastened to the bottom of the car and secured by the braces 14, the said brackets resting upon bearing plates 15, on the transom 6. The tilting load therefore is also transmitted through the springs 7, plank 8, and links 9 to the truck frame 10. In Fig. 5 the greater part of the central load is further transmitted from the frame 10 through the equalizing springs 16, the equalizing bars 17 to the journal boxes 18 and thereby to the axles 19 of the load carrier wheels or drivers 20. This much of the truck is considered the monorail feature of my invention.

To preserve the stability of the truck and thereby the train, the tilting load is transmitted from the truck frame 10 through the spiral springs 21 and the journal bearings 22 to the axles 23 and wheels 24. The car and truck are thereby maintained in an upright position.

In Fig. 5, the boxes 18 are provided with upper bearings 25, wedges 26, lower bearings 27 and wedges 28. Dampening springs 29 are placed between the bearings 18 and the straps 30 of the truck frame 10.

The motors 31 are mounted on the axles 19 and need no support from the truck frame 10 or the car 3, but are secured against rotative movement by the links 32 pivoted to the motor frame at 33 and to the truck frame 10 at 34.

In Figs. 1 and 4 the load carrier wheels 20 and the motors 31, are shown to clear the axles 23, making a long wheel base for the outer wheels 24.

Brakes 35 for the load carrier wheels 20 or 36 are shown in Fig. 4 and brakes 37 for wheels 24 in Fig. 5.

The operation of my invention is as follows: Were the outer rails perfectly true and without joints, the car 3, truck 10 and axle 19 would tilt over compressing the springs 21 on one side until the spring pressure equalizes the tilting force, but in practice irregularities and imperfect joints in the outer rails cause a vertical vibration of the wheels 24 and axles 23 which is transmitted through the bearings 22 to the springs 21 and the truck frame 10. The greater part of the load being carried by the load carrier wheels 20 and the springs 21 adjusted for light load upon the bearings 22, the result is that the car 3, truck 10, axle 19 and wheels 20, i. e., the monorail feature of my invention, tends to run true without rocking, the vibration of the wheels 24 and axles 23 transmitting a series of impulses to the truck frame 10, tending to maintain the truck and the car 3 in an upright position. By this construction of truck, the car is practically balanced on the central wheels 20. In case the springs 21 on one side of the truck were adjusted too fine, causing the car and truck to tilt too much to one side on starting out, when a medium high speed is reached, the vibration of the wheels 24 and axles 23 increases, causing an increase of pressure on the springs 21, or, in other words, the righting force of the truck becomes greater as the speed increases, and therefore any difference in the springs on opposite sides of the truck will lessen in proportion to the load as the speed increases and the car and truck will gradually come to an upright position. The dampening springs 29 prevent excessive vibration of the truck by adding a part of the momentum of the axles 19, wheels 20 and motors 31 to the momentum of the truck frame 10. The springs 29 are not strong enough to lift the axles 19, wheels 20 and motors 31, so that the wheels 20 are never raised from the track by the vibration of the truck frame 10. The wheels 20 running upon a smooth track as explained in the accompanying application, very little vibration is transmitted from the axles 19 through the springs 29 to the strap 30 and truck frame 10. The effect of the springs 29 is to make a very heavy truck, so that the wheels 24 and axles 23 vibrate through a large range without causing very much vibration of the truck.

When the truck is equipped with double tread wheel with flange, 20, to run on companion rails, sudden shifting of the load sidewise is avoided by making the flange clearance for the companion rails greater than that for the outer rails. The side motion of the truck being transmitted through the frame 10 to the load carrier wheels, the severity of the shock being greatly reduced by the transmission. In fact the side motion of the truck is transmitted to the load carrier wheels in a series of impulses resulting in a force in nature more akin to pressure. At the same time the flange clearance of the load carrier wheels is not so great but that, in case of spreading of the outer rails, the said flanges bear upon the companion rails, thereby preventing the derailment of the truck and accident to the train.

Where my system for high speed service is installed on existing trunk line railroads, or on existing interurban railways, having curves and turnouts, and my improved truck is equipped with double tread wheel with flange to run on companion rails in the center of the track, it is the intent and purpose of my invention to relay such curves and turnouts if necessary to give them sufficient radius for easy running of the truck. Where it is found undesirable to disturb existing curves and turnouts and the radii of curvature of the same are too small to allow the double tread wheel with flange to run over them, it is the intent and purpose of my invention to equip my improved truck with a flangeless wheel 36 to run on either a central rail or companion rails, as shown in Fig. 7, and fully explained in the accompanying application.

Having now described my invention, I wish to state further that in practice, owing to the variety of conditions encountered, various modifications of details and arrangement of parts will doubtless be found advisable and necessary and therefore I wish to reserve the right to make such changes without departing from the spirit and original conception of my invention as herein set forth.

I claim:

1. In a railway truck, the combination of a frame 10, a load carrying member or members, 1, 5, 6, 15, spring mounted upon and within the frame 10, the frame 10 spring mounted upon journal boxes 18 and 22 guided for vertical movement in the frame sides, load carrier wheels 20 or 36 centrally mounted on axles 19 journaled in the said boxes 18 and side wheels 25 mounted on axles 23, journaled in the said boxes 22, substantially as specified.

2. In a railway truck, the combination of a frame 10, a load carrying member or members 1, 5, 6, 15, spring mounted upon and within the frame 10, the frame 10 spring mounted upon journal boxes 18 and 22 guided for vertical movement in the frame sides, load carrier wheels 20 or 36 centrally mounted on axles 19 journaled in the said boxes 18, side wheels 24 mounted on axles 23 journaled in the said boxes 22 and means for driving some or all of the said wheels 20 or 36, substantially as specified.

3. In a railway truck the combination of a frame 10, a load carrying member or members 1, 5, 6, 15, elliptical springs 7, plank 8, links 9, equalizing bars 17, springs 16 between the frame 10 and the bars 17, journal boxes 18 and 22 guided for vertical motion in the frame sides, springs 21 between the frames 10 and the boxes 22, load carrier wheels 20 or 36, centrally mounted on axles 19 journaled in the said boxes 18 and side wheels 24 mounted on axles 23 journaled in the said boxes 22, substantially as specified.

4. In a railway truck, the combination of a frame, 10 a load carrying member or members 1, 5, 6, 15 elliptical springs, 7, plank 8, links 9, equalizing bars 17, springs 16, between the frame 10 and the bars 17, journal boxes 18 and 22 guided for vertical motion in the frame sides, springs 21 between the frame 10 and the boxes 22, load carrier wheels 20 or 36 centrally mounted on axles 19 journaled in the said boxes 18, side wheels 24 mounted on axles 23 journaled in the said boxes 22, and means for driving some or all of the wheels 20 or 36, substantially as specified.

5. In a railway truck, the combination of a frame 10, a load carrying member or members 1, 5, 6, 15 elliptical springs 7, plank 8, links 9, equalizing bars 17, springs 16 between the frame 10 and the bars 17, journal boxes 18 and 22 guided for vertical motion in the frame sides, springs 21 between the frame 10 and the boxes 22, load carrier wheels 20 or 36 centrally mounted on axles 19 journaled in the said boxes 18, side wheels 24 mounted on axles 23 journaled in the said boxes 22 and springs 29 between the under sides of the boxes 18 and the frame 10, 30, substantially as specified.

6. In a railway truck, the combination of a frame 10, a load carrying member or members 1, 5, 6, 15, elliptical springs 7, plank 8, links 9, equalizing bars 17, springs 16 between the frame 10 and the bars 17, journal boxes 18 and 22 guided for vertical motion in the frame sides, springs 21 between the frame 10 and the boxes 22, load carrier wheels 20 or 36 centrally mounted on axles 19 journaled in the said boxes 18, side wheels 24 mounted on axles 23 journaled in the said boxes 22, springs 29 between the under sides of boxes 18 and the frame 10, 30, and means for driving some or all of the said wheels 20 or 36, substantially as specified.

7. In a railway truck, the combination of a frame 10, a load carrier member or members spring mounted upon and within the frame, the said frame spring mounted upon journal bearings 18 and 22 guided for vertical movement by the frame sides, load carrier wheels 20 or 36 centrally mounted on axles 19 journaled in the said boxes 18, electric motors 31 mounted on the axles 19 between the wheels 20 or 36 and the boxes 18, means for preventing rotary motion of the motor frames and side wheels 24 mounted on axles 23 journaled in the said boxes 22, substantially as specified.

8. In a railway truck, the combination of a frame 10, a load carrier member or members spring mounted upon and within the frame, the said frame spring mounted upon journal bearings 18 and 22 guided for vertical movement by the frame sides, load carrier wheels 20 or 36 centrally mounted on axles 19 journaled in the said boxes 18, electric motors 31 mounted on the axles 19 between the wheels 20 or 36 and the boxes 18, means for preventing rotary motion of the motor frames, side wheels 24 mounted on axles 23 journaled in the said boxes 22, and springs 29 between the under sides of boxes 18, and the frame 10, 30, substantially as specified.

9. In a railway truck, the combination of a frame 10, bolster 1, truck bolster 5, transom 6, bearings 15, springs 7, plank 8, the bolster 5 and plank 8 guided for vertical and transverse movement in the frame 10, links 9, the frame 10 spring mounted upon journal bearings 18 and 22 guided for vertical movement in the frame sides, load carrier wheels 20 or 36 centrally mounted on axles 19 journaled in the said boxes 18, and side wheels 24 mounted on axles 23 journaled in the said boxes 22, substantially as specified.

10. In a railway truck, the combination of a frame 10, bolster 1, truck bolster 5, transom 6, bearings 15, springs 7, plank 8, the bolster 5 and plank 8 guided for vertical and transverse movement in the frame 10, links 9, the frame 10 spring mounted upon journal bearings 18 and 22 guided for vertical movement in the frame sides, load carrier wheels 20 or 36 centrally mounted on axles 19 journaled in the said boxes 18, side wheels 24 mounted on axles 23 journaled in the said boxes 22 and means for driving some or all of the said load carrier wheels 20 or 36, substantially as specified.

11. In a railway truck, the combination of a frame 10, bolster 1, truck bolster 5, transom 6, bearings 15, springs 7, plank 8, the bolster 5 and plank 8 guided for vertical and transverse movement in the frame 10, links 9, the frame 10 spring mounted upon journal bearings 18 and 22 guided for vertical movement in the frame sides, load carrier wheels 20 or 36, centrally mounted on axles 19, journaled in the said boxes 18, side wheels 24 mounted on axles 23 journaled in the said boxes 22, electric motors mounted on some or all of the axles 19 between the said wheels 20 or 36 and the said boxes 18 and means for preventing rotative movement of the motor frames, substantially as specified.

12. In a railway truck, the combination of a frame 10, bolster 1, truck bolster 5, transom 6, bearings 15, springs 7, plank 8, the bolster 5 and plank 8 guided for vertical and transverse movement in the frame 10, links 9, the frame 10 spring mounted upon journal bearings 18 and 22 guided for vertical movement in the frame sides, load carrier wheels 20 or 36 centrally mounted on axles 19 journaled in the said boxes 18, side wheels 24 mounted on axles 23 journaled in the said boxes 22, springs 29 between the under sides of boxes 18 and the frame 10, 30, electric motors mounted on some or all of the axles 19 between the said wheels 20 or 36 and the said boxes 18, and means for preventing rotative movement of the motor frames, substantially as specified.

13. In a railway truck, the combination of a frame 10, bolster 1, truck bolster 5, transom 6, side bearings 15, springs 7, plank 8, the bolster 5 and plank 8 guided for vertical and transverse movement in the frame 10, the links 9, equalizing bars 17, springs 16 between the frames 10 and the bars 17, journal boxes 18 and 22 guided for vertical movement by the frame sides, load carrier wheels 20 or 36 centrally mounted on axles 19 journaled in the said boxes 18, side wheels 24 mounted on axles 23 journaled in the said boxes 22, springs 21 between the frame 10 and the said boxes 22, substantially as specified.

14. In a railway truck, the combination of a frame 10, bolster 1, truck bolster 5, transom 6, side bearings 15, springs 7, plank 8, the bolster 5 and plank 8 guided for vertical and transverse movement in the frame 10, the links 9, equalizing bars 17, springs 16 between the frame 10 and the bars 17, journal boxes 18 and 22 guided for vertical movement by the frame sides, load carrier wheels 20 or 36 centrally mounted on axles 19 journaled in the said boxes 18, side wheels 24 mounted on axles 23 journaled in the said boxes 22, springs 21 between the frame 10 and the said boxes 22, springs 29 between the under sides of boxes 18 and the frame 10, 30, substantially as specified.

15. In a railway truck, the combination of a frame 10, bolster 1, truck bolster 5, transom 6, side bearings 15, springs 7, plank 8, the bolster 5 and plank 8 guided for vertical and transverse movement in the frame 10, the links 9, equalizing bars 17, springs 16 between the frame 10 and the bars 17, journal boxes 18 and 22 guided for vertical movement by the frame sides, load carrier wheels 20 or 36 centrally mounted on axles 19 journaled in the said boxes 18, side wheels 24 mounted on axles 23 journaled in the said boxes 22, springs 21 between the frame 10 and the said boxes 22, electric motors mounted on some or all of the said axles 19 between the wheels 20 or 36 and the boxes 18, means to prevent rotation of the motor frames, and springs 29 between the under sides of boxes 18 and the frame 10, 30, substantially as specified.

16. In a railway truck, the combination of a frame, a load carrying member or members spring mounted upon and within the said frame, the said frame spring mounted on central load carrier wheels and spring mounted on side wheels, and means for braking some or all of the central or of the outer wheels, substantially as specified.

17. In a railway truck, the combination of a frame 10, a load carrying member or members spring mounted upon and within the said frame, the frame 10 spring mounted upon journal boxes 18 and 22 guided for vertical movement in the frame sides, load carrier wheels 20 or 36 centrally mounted on axles 19 journaled in the said boxes 18, side wheels 24 mounted on axles 23 journaled in the said boxes 22, and means for braking some or all of the said wheels 20 or 36 or all of the said wheels 24, substantially as specified.

18. In a railway truck, the combination of a frame 10, bolster 1, truck bolster 5, transom 6, side bearings 15, springs 7, plank 8, the bolster 5 and plank 8 guided for vertical and transverse movement in the frame 10, the links 9, equalizing bars 17, springs 16 between the frame 10 and the bars 17, journal boxes 18 and 22 guided for vertical movement by the frame sides, load carrier wheels 20 or 36 centrally mounted on axles 19 journaled in the said boxes 18, side wheels 24 mounted on axles 23 journaled in the said boxes 22, springs 21 between the frame 10 and the boxes 22, electric motors mounted on some or all of the said axles 19 between the wheels 20 or 36 and the boxes 18, means to prevent rotation of the motor frames, springs between the under sides of boxes 18 and the frame 10, 30 and means for braking some or all of the said wheels 20 or 36 or some or all of the said wheels 24, substantially as specified.

SAMUEL E. HITT.

Witnesses:
C. L. GUTHRIE,
CHARLES A. NIMAN.